Patented Sept. 8, 1936

2,054,050

UNITED STATES PATENT OFFICE 2,054,050

SOLVENT REFINING OIL

Louis A. Clarke, Fishkill, N. Y., assignor to The Texas Company, New York, N. Y., a corporation of Delaware No Drawing. Application May 7, 1935, Serial No. 20,191

2 Claims. (Cl. 196—13)

This invention relates to refining hydrocarbon oil and more particularly to refining mineral oil such as mineral lubricating oil by solvent extraction.

The invention contemplates the treatment and refining of mineral oil with a selective solvent liquid selected from the group comprising methyl, ethyl and propyl esters of amino benzoic acids, and in particular the ortho and meta forms.

Methyl orthoaminobenzoate or methyl anthranilate is an example of one of the foregoing compounds which I have found to be effective as a solvent refining agent for lubricating oil, and it has the following structural formula:

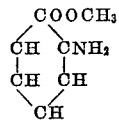

More specifically my invention comprises extracting lubricating oil with solvent of the foregoing type to separate the oil into fractions respectively rich in low viscosity index and high viscosity index constituents. The high viscosity index oil fraction thus obtained after removal of the solvent, provides a lubricating oil product possessing superior lubricating properties.

In the application of my invention to the treatment of mineral lubricating oil such as obtained from Mid-Continent crude, for example, and which contains naphthenic or low viscosity index constituents as well as paraffinic or relatively high viscosity index constituents, the oil is mixed with the solvent liquid in the proportion of about one part of oil to from one to two or four parts of solvent liquid. This mixture after thorough agitation at a suitable temperature, as for example around 75–100° F. or higher, is allowed to separate into two layers one of which comprises an extract phase while the other comprises a raffinate phase. The extract phase will comprise the naphthenic constituents of relatively low viscosity index dissolved in the major proportion of the solvent liquid, while the raffinate phase will comprise the paraffinic constituents of relatively high viscosity index mixed with some of the solvent liquid.

These two phases are separated from each other and the solvent liquid recovered therefrom either by distillation or by washing with some other and more volatile solvent liquid.

The extent to which the oil is soluble in the solvent depends upon the nature of the oil as well as the temperature of extraction and the ratio of solvent liquid to oil employed during extraction. The extraction temperature and the ratio of solvent to oil may be varied for the purpose of effecting the particular degree of extraction desired. Consequently, in some instances, it may be desirable to employ temperatures somewhat below or somewhat higher than those mentioned above. Likewise, the ratio of solvent to oil may be either greater or less than that specified.

By way of specific example, an untreated dewaxed distillate oil prepared from Mid-Continent crude and having the tests indicated below was extracted with methyl anthranilate in order to effect separation between the low and high viscosity index constituents.

One part of the oil was extracted with two parts of the solvent liquid in a batch type of extraction at a temperature of about 77° F. While at this temperature the mixture of oil and solvent was allowed to separate into extract and raffinate phases.

These phases were then separated and the solvent liquid removed therefrom by distillation. After removal of the solvent from the raffinate phase, the refined oil was found to have the following tests, as compared with the oil before extraction:

| | Oil before extraction | Raffinate oil |
|---|---|---|
| Gravity A. P. I. | 21.3 | 27.0 |
| Saybolt universal viscosity at 100° F. | 1236 | 677 |
| Saybolt universal viscosity at 210° F. | 80.5 | 68 |
| Viscosity index | 51 | 79.5 |
| Carbon residue, percent | 0.60 | 0.17 |
| Color—Tag-Robinson | ½ | 5 |

As shown in the foregoing tabulation, the raffinate oil had a viscosity index of 79.5 as compared with 51 in the case of the oil before extraction. It will also be observed that the raffinate oil was of greatly improved color. This raffinate oil amounted to about 64% of the untreated oil.

While a batch type of extraction has been described in the foregoing example, it is contemplated that the continuous countercurrent type of extraction may also be employed.

In some instances it may be of advantage to carry out the extraction in the presence of a modifying solvent liquid such as benzol or a light petroleum fraction such as propane or butane for the purpose of facilitating extraction and further controlling the extent thereof.

The invention is not necessarily restricted to the treatment of lubricating oil fractions since the solvents may be adapted to the refining and purification of other fractions including naphtha, kerosene etc. It is applicable to the treatment of residual as well as distillate fractions of mineral oil. Furthermore, the oil may be subjected to the foregoing extraction treatment either before or after treatment with other solvents or chemicals and in the case of a wax-bearing oil, the extraction may either precede or follow dewaxing.

It is contemplated also that the solvent of my invention may comprise a mixture of two or more of the above mentioned methyl, ethyl and propyl esters including their isomers. While the ortho and meta forms have been specified, it is contemplated that the para forms may in some instances be used either alone or in admixture with other related compounds.

Obviously many modifications and variations of the invention, as hereinbefore set forth, may be made without departing from the spirit and scope thereof and therefore only such limitations should be imposed as are indicated in the appended claims.

I claim:

1. In the refining of mineral lubricating oil containing relatively low and relatively high viscosity index constituents to separate therefrom a relatively high viscosity index fraction, the method which comprises mixing the oil with a solvent selected from the group consisting of methyl, ethyl and propyl amino benzoate, forming an extract phase containing relatively low viscosity index constituents of the oil dissolved in the solvent liquid and a raffinate phase comprising the relatively high viscosity index constituents of the oil, separating the two phases and removing the solvent liquid therefrom.

2. In the refining of mineral lubricating oil containing relatively low and relatively high viscosity index constituents to separate therefrom a relatively high viscosity index fraction, the method which comprises mixing the oil with methyl ortho amino benzoate, forming an extract phase containing relatively low viscosity index constituents of the oil dissolved in the solvent liquid and a raffinate phase comprising the relatively high viscosity index constituents of the oil, separating the two phases and removing the solvent liquid therefrom.

LOUIS A. CLARKE.